United States Patent
Kumar et al.

(10) Patent No.: US 8,068,614 B2
(45) Date of Patent: Nov. 29, 2011

(54) METHODS AND APPARATUS FOR BATCH BOUND AUTHENTICATION

(75) Inventors: Mohan J. Kumar, Aloha, OR (US); Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 11/864,887

(22) Filed: Sep. 28, 2007

(65) Prior Publication Data

US 2009/0086981 A1    Apr. 2, 2009

(51) Int. Cl.
*H04L 9/08* (2006.01)
*G06F 3/00* (2006.01)
*H04L 9/32* (2006.01)

(52) U.S. Cl. ............... 380/285; 710/8; 713/176

(58) Field of Classification Search ......... 380/285; 710/8; 713/176
See application file for complete search history.

(56) References Cited

U.S. PATENT DOCUMENTS

| | | | |
|---|---|---|---|
| 6,918,036 B1 * | 7/2005 | Drews | 713/176 |
| 6,928,548 B1 * | 8/2005 | Hale et al. | 713/187 |
| 7,480,740 B1 * | 1/2009 | Saxena et al. | 710/8 |
| 7,552,333 B2 * | 6/2009 | Wheeler et al. | 713/176 |
| 7,565,544 B1 * | 7/2009 | Eatough et al. | 713/176 |
| 7,676,840 B2 * | 3/2010 | Morais et al. | 726/21 |
| 7,890,763 B1 * | 2/2011 | Law et al. | 713/176 |
| 2002/0095601 A1 * | 7/2002 | Hind et al. | 713/201 |
| 2003/0196110 A1 * | 10/2003 | Lampson et al. | 713/200 |
| 2004/0158711 A1 * | 8/2004 | Zimmer | 713/165 |
| 2005/0079868 A1 * | 4/2005 | Shankar et al. | 455/435.1 |
| 2006/0129848 A1 * | 6/2006 | Paksoy et al. | 713/193 |
| 2006/0174109 A1 * | 8/2006 | Flynn | 713/164 |
| 2008/0077592 A1 * | 3/2008 | Brodie et al. | 707/9 |
| 2008/0320024 A1 * | 12/2008 | Thirumalai et al. | 707/102 |

* cited by examiner

*Primary Examiner* — Techane Gergiso
(74) *Attorney, Agent, or Firm* — Trop, Pruner & Hu, P.C.

(57) ABSTRACT

A processing system may include a processing unit and non-volatile storage responsive to the processing unit. The non-volatile storage may include a candidate boot code module and an authentication code module. The processing unit may be configured to execute code from the authentication code module before executing code from the candidate boot code module. The authentication code module may have instructions which, when executed by the processing unit, cause the processing unit to read a processor identifier from the processing unit and determine whether the processor belongs to a predetermined set of processors associated with a specific vendor, based at least in part on the identifier, before executing any instructions from the candidate boot code module. The processing system may also test authenticity of the candidate boot code module before executing any instructions from the candidate boot code module. Other embodiments are described and claimed.

14 Claims, 4 Drawing Sheets

METHODS AND APPARATUS FOR BATCH BOUND AUTHENTICATION

FIELD OF THE INVENTION

The present disclosure relates generally to the field of data processing, and more particularly to methods and related apparatus for authenticating components of processing systems.

BACKGROUND

A processing system may include hardware resources, such as a central processing unit (CPU), random access memory (RAM), and nonvolatile storage such as read only memory (ROM) and one or more hard disk drives. The processing system may also include software resources, such as a basic input/output system (BIOS) and one or more operating systems (OSs). When the computer system is started or reset, it may load and run the BIOS, and then boot to the OS.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
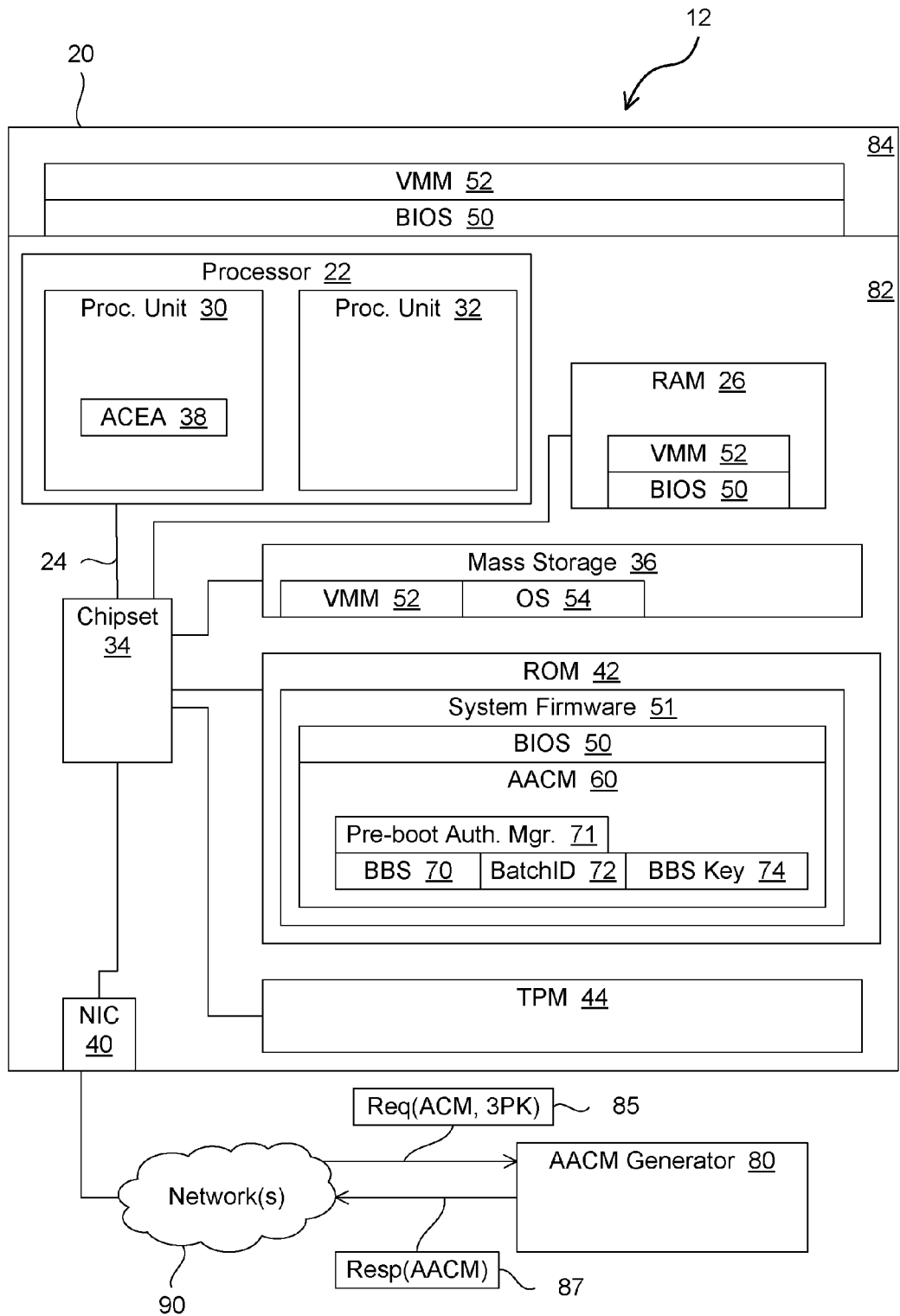
FIG. 1 is a block diagram depicting a suitable data processing system in which certain aspects of an example embodiment of the present invention may be implemented.

Security attacks on personal computer (PC) systems are no longer confined to just application attacks and OS attacks. New usage models, such as media players with digital rights management (DRM) restrictions and BIOS-locked OS recovery mechanisms, rely heavily on the system firmware for security. With PC vendors relying on system firmware to provide and protect value on the system, attacks have recently expanded to include physical tampering with the system, including maliciously updating or swapping of the BIOS ROM.

To prevent unauthorized software from running on a processing system during the boot process, the processing system may authenticate the boot software before running it. Such a system may be said to use authenticated boot code. A processing system may implement verified boot by means of a public key from the vendor of the processing system. However, conventional mechanisms to install the cryptographic key from the processing system vendor into the system may be prohibitive due to cost, complexity, or security reasons. Further, a processing system vendor may be an original equipment manufacturer (OEM), and the OEM may wish to ensure that its firmware image be locked to intended target processing platforms only. This may prevent attack on vendor processing platforms using older firmware images or other vendor firmware images.

This disclosure describes methods and systems for authenticating hardware and software in a processing system before allowing the processing system to boot. For instance, a processing system may automatically authenticate the BIOS before allowing the BIOS to execute on a CPU. In addition, the processing system may check for unauthorized hardware (e.g., an unauthorized processor) in the processing system before allowing the processing system to boot.

In addition to the BIOS, a processing system may also include preliminary boot code (e.g., an authentication code module) that the CPU loads and executes before loading the BIOS and booting to an OS. The preliminary boot code may include control logic for implementing some or all of the pre-boot authentication process. For instance, the preliminary boot code may load a pre-boot authentication manager from ROM. Along with the BIOS, the pre-boot authentication manager may be part of the system firmware image. When the pre-boot authentication manager is executed, it may authenticate that entire system firmware image.

In one embodiment, hardware and software in a processing system can be authenticated without requiring a TPM in the processing system or fuses in a CPU to permanently store digital keys. Furthermore, the authentication mechanism may be customizable to individual processing system vendors, in a way that the protection is specific to a selected batch of systems associated with a particular vendor. For example, this disclosure describes a signature scheme with a scope that can be limited to a given set or batch of processor identifiers (IDs). This signature scheme can be used for an authenticated boot mechanism that allows verification of the BIOS image prior to running the BIOS, thus ensuring that the system only runs the BIOS image that is authorized for the system.

For purposes of this disclosure, the following terms have the following meanings:

A "batch" is a set of components or devices, with each device having an ID. For example, a device may be a processor with a processor ID or CPU ID.

A "BatchID" is an identifier that uniquely identifies a particular batch.

"IsInBatch(X)" is a function that accepts as input the ID for a component and returns a result indicating whether or not that component belongs to a particular set. For example, IsInBatch(X) may return the value 1 if the component with the ID of X belongs to the set, or the value 0 if component does not belong to the set).

For instance, a particular batch may be defined as the set of all devices with a serial ID between the two integers LOW and HIGH, inclusive. Consequently, IsInBatch(X) may return 1 if and only if LOW$\leq$X$\leq$HIGH. The BatchID may be the pair LOW HIGH.

Alternatively, for non-continuous batch identification, a batch that consists of k (k$\geq$1) consecutive intervals can be uniquely identified by k pairs of numbers (e.g., LOW1 HIGH1, LOW2 HIGH2, . . . LOWk HIGHk. Consequently, IsInBatch(X) may indicate that a serial number X is in the batch if and only if LOWj$\leq$X$\leq$HIGHj for some j between 1 and k.

The above concepts are used below to allow any processor within a given batch to authenticate a BIOS image, while any processor that does not belong to the batch is not able to authenticate the BIOS image.

For purposes of this disclosure, a "batch bound signature" (BBS) is a digital signature associated with a batch of devices and a message, such that the signature can be authenticated by devices which belong to that batch, but the signature cannot be authenticated by devices which do not belong to that batch. For example, a BBS on a message M, which is bound to a batch identified by BatchID, may be implemented as a signature on M||BatchID (where "||" denotes concatenation).

Also, "batch bound authentication" (BBA) is the process of authenticating a BBS. When a device whose ID equals X performs BBA on an input BBS, the device may perform a procedure that consists of authenticating the message and verifying that X is in the associated batch. For purposes of this disclosure, the "message manager" is the entity that provides the message that needs to be authenticated by the device, and the "batch manager" is the entity that provides the BatchID.

One application of the techniques described herein is for an authenticated boot mechanism that provides for verification of the system BIOS prior to running the BIOS, thus ensuring that the system only boots the BIOS image that is intended for the specific batch of systems. In such a scenario, the device could be a CPU. The batch manager could be the CPU manufacturer. The message manager could be the entity that incorporates the CPU into a computer system (e.g. an OEM). And the message could be a BIOS image (or a subset of the BIOS image, such as the BIOS boot block) that has been approved for use in the computer system by the OEM.

When such a system is turned on or reset, the pre-boot authentication manager may run on the CPU to perform the BBA. In one embodiment, if the BBA succeeds, the pre-boot authentication manager allows the processor to jump to the reset vector, to complete a more or less conventional system boot process. A BBA failure indicates that system BIOS has been compromised and/or the processor does not belong to the authorized batch. Consequently, the processor boot process may be terminated without giving control to the BIOS.

Any suitable values may be used for the device identifiers and the BatchIDs. For example, in one embodiment, each device may get a unique identifier. For instance, a processor may use an enhanced CPUID having a new sub-string for a serial number, or a unique TPM ID may be used. In another embodiment, multiple devices may use the same identifier. For instance, standard CPU identifiers that indicate CPU generation and/or stepping may be used. Alternatively, a TPM ID that identifies a generation of TPMs may be used. Alternatively, the message manager may assign an identifier from the system to uniquely identify each system or to identify a set of systems.

For purposes of this disclosure, with regard to processing units and with regard to processing systems that include processing units, a "first party" is the manufacturer of the processor, and a "third party" is any other entity associated with the processing unit or processing system. For instance, manufacturers of processing systems and owners of processing systems are considered "third parties."

As described in greater detail below, when building a processing system, an OEM may obtain an augmented authentication code (AC) module that contains an OEM shared secret key referred to in this application as third party cryptographic key (3PK) to be installed in the CPU of that processing system. As described in greater detail below, within the augmented AC module, the 3PK may be protected by encryption, based on a processing unit key (PUK). For purposes of this disclosure, a processing unit key or PUK is a cryptographic key that is stored in a processor when the processor is manufactured, and that remains in the processor in nonvolatile form. For instance, the processor may retain the key despite a power cycle or reset of the processor. The augmented AC module may also include preliminary boot code, and the augmented AC module may be protected with a signature.

The augmented AC module may be stored in boot storage (e.g., the flash memory that typically contains the BIOS code). Subsequently, on reset, the CPU may locate and run the preliminary boot code in the augmented AC module. Accordingly, AC modules, and similar types of modules, that have been augmented with an encrypted 3PK may be considered augmented boot code modules. In one embodiment, the CPU may use a firmware interface table (FIT) as a standard mechanism to locate and run the augmented AC module. Additional information about FITs is provided in the Intel® Itanium® Processor Family System Abstraction Layer Specification, dated December 2003, which may be obtained from the Internet at download.intel.com/design/Itanium/Downloads/24535907.pdf. When run, the augmented AC module may utilize the 3PK to verify the authenticity of the boot image.

FIG. 1 is a block diagram depicting a suitable data processing system 20 in which certain aspects of an example embodiment of the present invention may be implemented. Data processing system 20 has various hardware components 82, such as a central processing unit (CPU) 22, communicatively coupled to various other components via one or more system buses 24 or other communication pathways or mediums. For example, processor 22 may be communicatively coupled to one or more volatile or nonvolatile data storage devices, such as RAM 26, read-only memory (ROM) 42, mass storage devices 36 such as hard drives, and/or other devices or media, such as floppy disks, optical storage, tapes, flash memory, memory sticks, digital video disks, etc. For purposes of this disclosure, the term "ROM" may be used in general to refer to nonvolatile memory devices such as erasable programmable ROM (EPROM), electrically erasable programmable ROM (EEPROM), flash ROM, flash memory, etc. Also, the term "bus" refers to shared communication pathways, as well as point-to-point pathways. Processor 22 may also be communicatively coupled to additional components, such as a video controller, integrated drive electronics (IDE) controllers, small computer system interface (SCSI) controllers, universal serial bus (USB) controllers, input/output (I/O) ports, input devices, output devices such as a display, etc. Some components may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

CPU 22 may include two or more processing units, such as processing unit 30 and processing unit 32. Alternatively, a processing system may include a CPU with one processing unit, or multiple processors, each having at least one processing unit. The processing units may be implemented as processing cores, as Hyper-Threading (HT) technology, or as any other suitable technology for executing multiple threads simultaneously or substantially simultaneously.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

In the embodiment of FIG. 1, processing system 20 also includes a TPM 44. Processor 22, RAM 26, TPM 44, and other components may be connected to a chipset 34. Chipset 34 may include one or more bridges or hubs for communicatively coupling system components, as well as other logic and storage components. In other embodiments, other types of security coprocessors may be used, or the security processor may be omitted.

Processing system 20 may be controlled, at least in part, by input from conventional input devices, such as a keyboard, a mouse, etc., and/or by directives received from another machine, biometric feedback, or other input sources or signals. Processing system 20 may utilize one or more connections to one or more remote data processing systems, such as through a network interface controller (NIC) 40, a modem, or other communication ports or couplings. Processing systems may be interconnected by way of a physical and/or logical network, such as a local area network (LAN), a wide area network (WAN), an intranet, the Internet, etc. Communications involving the network may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

For instance, at times, processing system 20 may operate in a data processing environment 12 involving one or more remote processing systems, such as a server referred to as an augmented authentication code module (AACM) generator 80. Processing system 20 and AACM generator 80 may communicate via a network 90. For example, processing system 20 may be located in an OEM assembly plant 102, and when the OEM is assembling or configuring processing system 20, the OEM may cause processing system 20 to communicate with AACM generator 80 to provision processing system 20 with one or more 3PKs specific to that OEM, as described in greater detail below.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or nonvolatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations. The programs in processing system 20 may be considered components of a software environment 84.

For instance, when processing system 20 boots, a BIOS 50 and a VMM 52 may be loaded into RAM 26 and executed within software environment 84. VMM 52 may include components which more or less serve as an OS, or it may run on top of a host OS 54. BIOS 50 may be implemented in accordance with Version 2.0 of the Unified Extensible Firmware Interface Specification, dated Jan. 31, 2006, for instance. In the example embodiment, BIOS 50 is part of a system firmware image 51 that resides in ROM 42. System firmware 51 may also include modules such as an augmented AC module (AACM) 60. As described in greater detail below with regard to FIG. 6, AACM 60 may include a pre-boot authentication manager 71 that causes processing system 20 to authenticate system firmware image 51 before allowing BIOS 50 to run. Pre-boot authentication manager 71 may also verify a processor identifier for processor 22 before allowing BIOS 50 to run. These authentications may be performed using a BBS.

Figure 2:
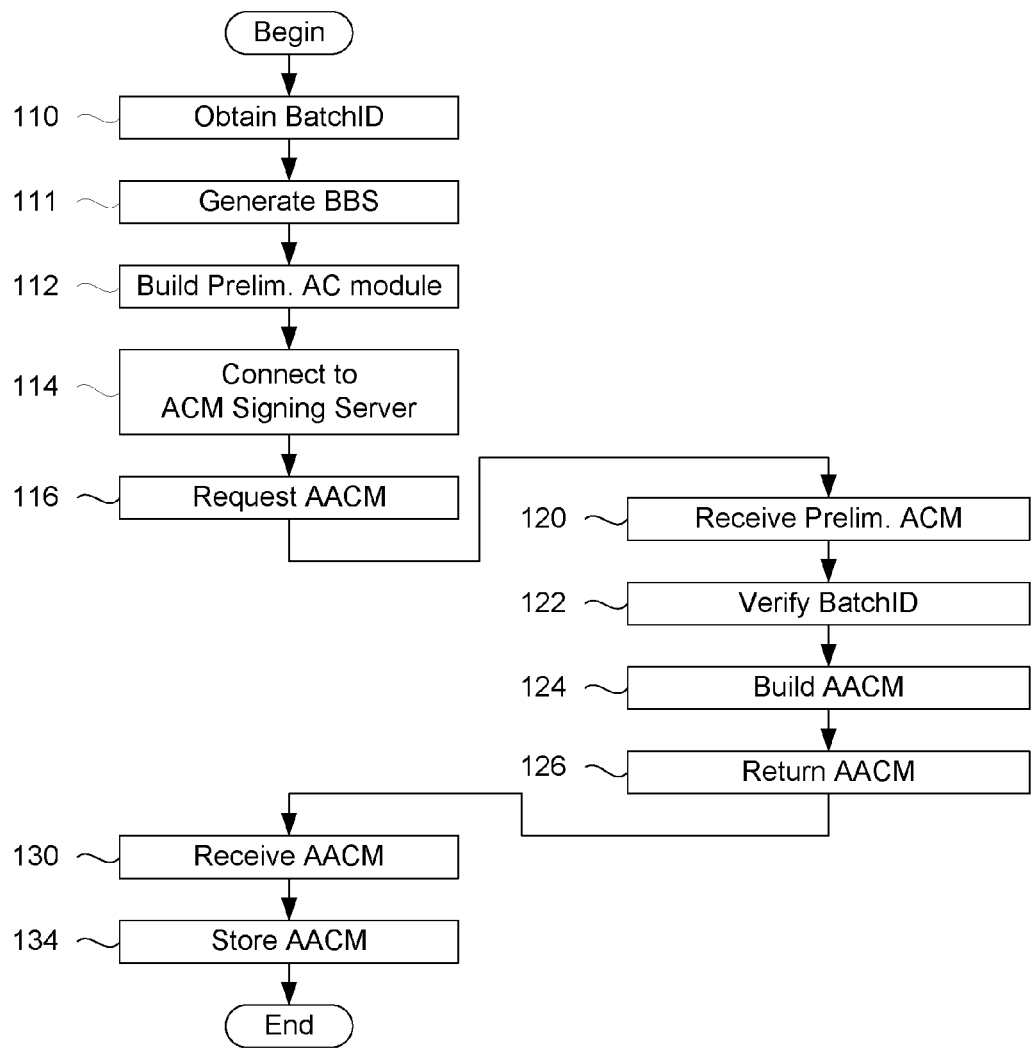
FIG. 2 is a flowchart of an example embodiment of a process for provisioning the processing system of FIG. 1 with a batch bound signature.

FIG. 2 is a flowchart of a process for provisioning processing system 20 with a BBS, according to an example embodiment of the present invention. The illustrated process pertains to assembly or configuration operations managed by an OEM, beginning after the OEM has selected processing system 20 to be provisioned with a BBS. At block 110, the OEM selects obtains a BatchID covering CPU 22 from the CPU vendor (e.g., from AACM generator 80). Alternatively, the OEM may obtain the BatchID before selecting any specific processing system to provision.

At block 111, the OEM generates a BBS, as described in greater detail below. At block 112, the OEM prepares a preliminary AC module. In the example embodiment, the OEM uses a format such as the one described in the LaGrande Technology Preliminary Architecture Specification, dated September 2006 (hereinafter "the LTPA Specification"), for the AC module. The LTPA Specification is currently available from the Internet at www.intel.com/technology/security/downloads/LT_spec_0906.pdf.

The example processing system of FIG. 1 provides launch and control interfaces using functions known as safer mode extensions (SMX). Additional information concerning SMX may be obtained from the LTPA Specification. The LTPA Specification also describes how an AC module can be authenticated and executed. For example, pages 11 and 12 provide the following explanations:

> To support the establishment of a protected environment, SMX enables the capability of an authenticated code execution mode. This provides the ability for a special code module, referred to as the authentication code module (AC module), to be loaded into internal RAM (referred to as authenticated code execution area) within the processor. The AC module is first authenticated and then executed using a tamper resistant method.
>
> Authentication is achieved through the use of a digital signature in the header of the AC module. The processor calculates a hash of the AC module and uses the result to validate the signature. Using SMX, a processor will only initialize processor state or execute the AC code module if it passes authentication. Since the authentication code module is held within internal RAM of the processor, execution of the module can occur in isolation with respect to the contents of external memory or activities on the external processor bus.

Referring again to block 112, to prepare the preliminary AC module, the OEM may load user code/data into the user area of the preliminary AC module. Here, the preliminary AC module serves as a formatted input of OEM content that needs to be embedded in the augmented AC module. In one embodiment, the code in the user area includes pre-boot authentication manager 71 (e.g., the instructions to perform authentication before control is given to BIOS 50), as well as the BBS 70, the BatchID 72, and the key 74 used to generate the BBS. Key 74 may also be referred to as the BBS key 74. Processing system 20 may also populate other portions of the preliminary AC module, such as the size field, for instance.

As shown at block 114, processing system 20 may then connect to AACM generator 80. In the example embodiment, processing system 20 and AACM generator 80 establish a secure channel to communicate encrypted data. Any suitable technique may be used to establish that secure channel. As shown at block 116, processing system 20 may then send a message or request 85 to AACM generator 80. As shown in FIG. 1, request 85 may include the preliminary AC module and one or more 3PKs.

Returning to FIG. 2, as shown at block 120, AACM generator 80 may receive the preliminary AC module and the other information from processing system 20. As shown at block 122, AACM generator 80 may then verify BatchID 72.

In the embodiment of FIG. 2, AACM generator 80 is managed by the manufacturer of processor 22, and AACM generator 80 uses a predetermined processor manufacture key (PMK) to encrypt the 3PKs. In the embodiment of FIG. 2, the PMK is a private key, and processing unit 30 includes a PUK that is the corresponding public key. In another embodiment, the PMK and the PUK may be the same key (i.e., they may have the same value).

In the embodiment of FIG. 1, the PUK may be permanently burned into processing unit 30 by the manufacturer of processor 22 during the manufacturing process, before processor 22 is shipped to a purchaser such as an OEM. The manufacturer of processor 22 may keep the PMK secret, such that no other entity ever learns the value of the PMK. Alternatively, the processor manufacturer may arrange for a separate trusted entity to manage AACM generator 80. Although the PUK may be considered a "public" key, it may also be kept secret, such that its value is never released by processing unit 30.

As shown at block 124, AACM generator 80 may then build an AACM 60 that includes the encrypted 3PKs (E3PKs). For instance, AACM generator 80 may append the E3PKs to the user data of the preliminary AC module and update the module size field. Alternatively, AACM 60 may include one or more predefined fields for holding encrypted 3PKs. An AACM that includes an encrypted version of a 3PK may also be referred to as an encrypted AC (EAC) module.

Figure 3:
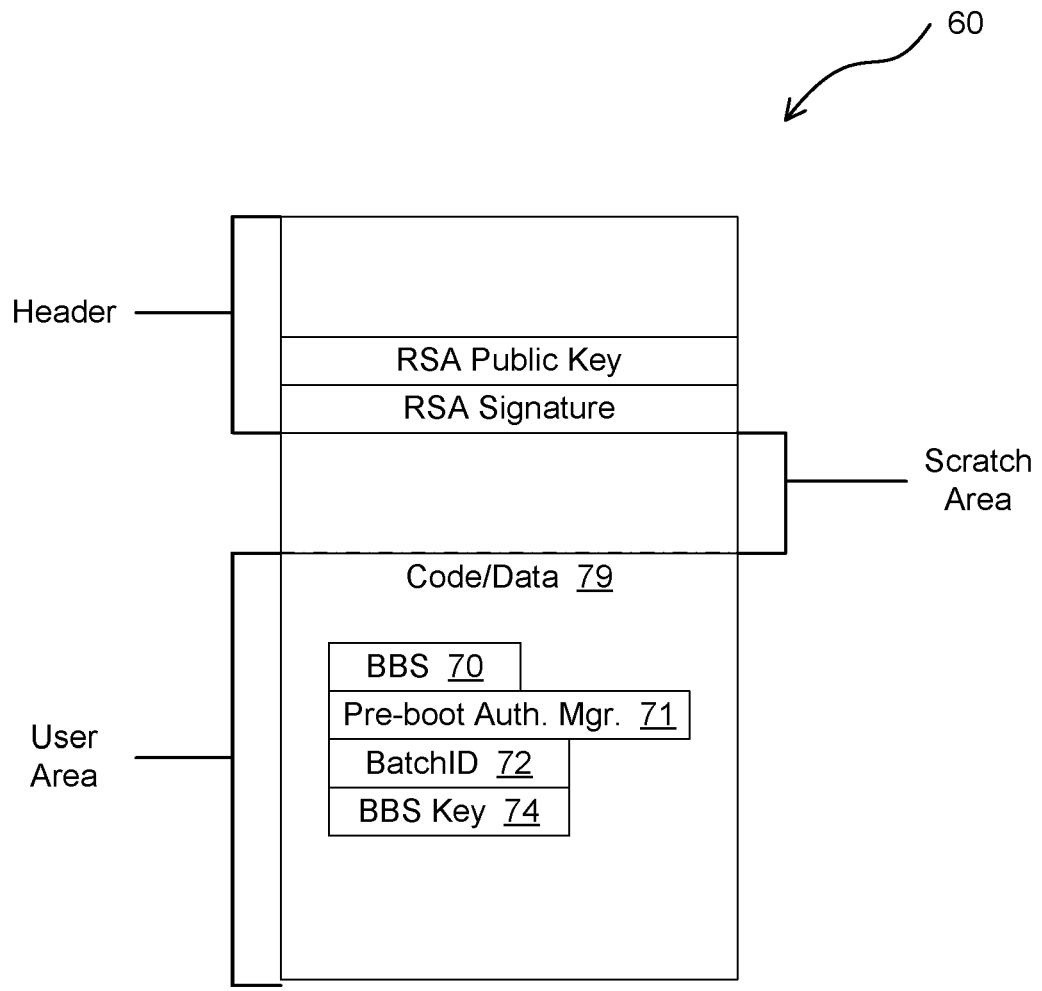
FIG. 3 is a block diagram of an example embodiment of an augmented authentication code module.

FIG. 3 is a block diagram of AACM 60 from FIG. 1, showing a module header, which is followed by a scratch area, followed by a user area with the encrypted 3PKs appended at or near the end of the module, following the user code/data from the preliminary AC module. Alternatively, an AC module may be structured with one or more independent fields, possibly in the module's header, to hold items such as the BBS, the BatchID, the BBS key, and the encrypted 3PKs. The instructions and other data in the user area are referred to herein as AACM code 79. In the embodiment of FIG. 3, the module header includes an RSA public key and an RSA signature for authenticating AACM 60 as a whole, while AACM code 79 includes the BBS key 74 for authenticating BBS 70 in particular. As illustrated, pre-boot authentication manager 71 may also be part of AACM code 79.

Referring again to FIG. 2, AACM generator 80 then sends AACM 60 to processing system 20, as shown at block 126. Transmission of the AACM to processing system 20 is also depicted in FIG. 1 with regard to response 87.

Processing system 20 may receive AACM 60 from AACM generator 80 at block 130 of FIG. 2. As shown at block 134, processing system 20 may then store AACM 60 in ROM 42, as depicted in FIG. 1. Thus, an OEM or other entity performing system configuration may install a BBS and cryptographic keys such as E3PK into the system ROM (e.g., ROM 42). Furthermore, since E3PK is itself encrypted, even if an attacker were able to extract E3PK from ROM 42, the attacker still would not be able to decrypt and use E3PK. In the embodiment of FIG. 1, processing unit 30 is configured to serve as a bootstrap processor (BSP), and processing system 20 is configured to use ROM 42 as the boot storage (i.e., the nonvolatile storage from which processing unit 30 obtains instructions for initializing and configuring processing system 20 at power up or reset).

Processing system 20 may then use one or more of the 3PKs to compute authentication codes for various software components to be protected (e.g., VMM 52 and OS 54), and processing system 20 may save those authentication codes as manifests in processing system 20. In the example embodiment, a hashed message authentication code (HMAC) is used for each authentication code or manifest. The HMACs may have the form $$\text{HMAC}_K(m) = h((K \text{ xor } o\text{pad}) \| h((K \text{ xor } i\text{pad}) \| m))$$

where m is the message or data to be protected, h is the hashing function, K is the selected 3PK, ipad is a predefined inner pad constant, and opad is a predefined outer pad constant. Additional information concerning HMACs is currently available from the Internet at http://en.wikipedia.org/wiki/HMAC.

Referring again to block 111, a variety of different techniques may be used for creating and authenticating BBSs.

Shared-Secret-Based BBA

One approach may use a message authentication code (MAC) such as an HMAC. For instance, an OEM may compute a hash (H) of the approved BIOS image for a computer system. The OEM may also acquire a BatchID to cover the processing unit (or units) for the computer system from the batch manager (e.g., from the CPU manufacturer). The OEM may then use a secret key "SKey" to generate BBS=HMAC (H||BatchID), using any suitable HMAC algorithm. The OEM may then send SKey, BBS, and BatchID to the batch manager (e.g., the processor manufacturer), as indicated above. The SKey may serve as the BBS Key.

The processor manufacturer may then create a data module (e.g., an AACM) that facilitates secure loading of SKey (and optionally BatchID) into a device such as a processor, as indicated above. In one embodiment, that data module is loaded into the processor dynamically, such as on reset. In an alternative embodiment, that data module may be loaded into the processor permanently.

When the processor manufacturer receives SKey, BBS, and BatchID from the OEM, the processor manufacturer may first verify that BatchID matches a batch assigned to that OEM. The processor manufacturer may then embed SKey, BBS, and BatchID in an augmented authentication code module (AACM). The processor manufacturer may also load the pre-boot authentication manager into the AACM. Alternatively, as described above, the processor manufacturer may generate AACM 60 based on a preliminary AC module that already includes items such as pre-boot authentication manager 71, BBS Key 74, BatchID 72, and BBS 70. The processor manufacturer may then send the AACM to the OEM.

The OEM may install the AACM in the computer system, along with a processor with an identifier "X" belonging to BatchID. As indicated above, the AACM may include the BBS. The OEM may then ship the computer system to a user.

After the AACM has been installed, boot processes for the computer system may involve processor X performing BBA, using the SKey and the HMAC algorithm. For example, processor 22 may load and run pre-boot authentication manager 71 from AACM 60. Pre-boot authentication manager 71 may then determine whether X is in BatchID 72. Pre-boot authentication manager may also compute a hash (H') of the current BIOS image in the computer system. Pre-boot authentication manager 71 may then use BBS Key 74, BatchID 72, and H' to compute BBS'=HMAC(H'||BID). Pre-boot authentication manager 71 may then compare BBS' against BBS 70 from AACM 60. If X is in BatchID 72 and BBS' matches BBS 70, pre-boot authentication manager 71 may conclude that the BBA was successful, and may therefore allow the boot process to proceed, for instance by jumping to the reset vector. Otherwise, pre-boot authentication manager 71 may interrupt or stop the boot process, possibly displaying, logging, and/or transmitting an appropriate error message.

Public-Key-Based BBA

An alternative method for creating and authenticating BBSs may be based on public keys. For instance, as for the process described above, an OEM may compute a hash "H" of the approved BIOS image for a computer system, acquire a BatchID from the CPU manufacturer, and then send H and BatchID to the CPU manufacturer. The CPU manufacturer may then verify that BatchID belongs to a batch provided to that OEM. After successful verification, the CPU manufacturer may compute a signed message "MSigned"=PublicKeySign(H∥BatchID), using the CPU manufacturer's private key "PrivKey." In this approach, batch managers may use RSA or any other suitable public key scheme to compute MSigned. The CPU manufacturer may then embed the corresponding public key "PubKey," MSigned, and BatchID in an AACM, which is returned to the OEM. Consequently, PubKey serves as the BBS Key, and MSigned serves as the BBS.

The OEM than embeds the AACM in a computer system with a processor from BatchID and ships the computer to a user. Thereafter, when the computer is started or reset, the processor loads the AACM and runs the pre-boot authentication manager from the AACM prior to jumping to the reset vector. When the pre-boot authentication manager runs, it may verify that the identifier for the current processor is in BatchID. The pre-boot authentication manager may also compute a hash (H') of the current BIOS image, and may use PubKey to compute M=PublicKeyDecrypt(MSigned). The pre-boot authentication manager may then compare H'∥BatchID against M. Upon successful completion of the above operations, the pre-boot authentication manager may conclude that the BBA was successful, and may therefore allow the boot process to proceed, for instance by jumping to the reset vector. Otherwise, the pre-boot authentication manager may interrupt or stop the boot process, possibly displaying, logging, and/or transmitting an appropriate error message.

Initialization Operations

When processing system 20 boots, it may authenticate the AACM and establish a protected communication channel between processor 22 and TPM 44. Such operations may begin after AACM 60 with E3PK has been stored in ROM 42, possibly according to the operations described above. In particular, the process may begin in response to processing system 20 being powered on or reset, which may cause microcode in processor 22 to examine a predetermined location in ROM 42 to determine whether ROM 42 contains an AC module. If an AC module is found, processor 22 may load the AC module into protected internal RAM within processing unit 30. The protected internal RAM to receive the AC module may be referred to as the authenticate code execution area (ACEA) 38.

For purposes of illustration, one may assume that processing unit 30 finds AACM 60 in ROM 42. Processing unit 30 may then determine whether AACM 60 is authentic, in accordance with the excerpt above from the LTPA Specification. For instance, processing unit 30 may (a) calculate a hash of certain portions of AACM 60, (b) use the RSA public key to decrypt the RSA signature, and (c) compare the decrypted signature with the hash to determine whether AACM 60 matches what the OEM originally signed with the corresponding RSA private key. Processing unit 30 may also verify the RSA public key against a predetermined list of valid public keys. For instance, processing unit may derive a hash value from the RSA public key and compare that value against a list of valid hash values in protected storage in processing system 20. If the RSA public key verifies good, and the hash of AACM 60 matches the decrypted RSA signature, processing unit 30 may conclude that AACM 60 is authentic.

If processing unit 30 is unable to find an AC module, or if processing unit 30 finds an AC module but determines that it is not authentic, processing unit 30 may log an appropriate error message. Processing unit 30 may then check a configuration setting in processing system 20 to determine whether processing system 20 should be allowed to use a non-ACM boot process. If a non-ACM boot is to be allowed, processing unit 30 may perform the non-ACM boot. If non-ACM boot is not allowed, the process may end without processing system 20 booting.

However, if processing unit 30 determines that AACM 60 is authentic, processing unit 30 may then extract the E3PKs from AACM 60. Processing unit 30 may temporarily store the E3PKs in one or more processor registers or other internal storage, for instance.

Processing unit 32 then decrypts the E3PKs and saves the results in protected storage within processing unit 32. In the embodiment of FIG. 1, that protected storage is implemented as one or more registers that (a) are only modifiable by privileged code; (b) cannot be read, written, or debugged by non-privileged code; and (c) cannot be accessed by in-target probes (ITPs). In this context, privileged code is code that could be carried external to the processor, but that requires special authentication before it is run by the processor, and that then runs in the processor in a sanitized environment, such that the privileged code execution cannot be observed or manipulated by malicious parties. In an alternative embodiment, the processing system may wait until a future time to decrypt the E3PKs that are not needed for establishing a secure channel with the TPM. In the embodiment of FIG. 1, processing unit 30 uses the PUK to decrypt the E3PKs.

Processing unit 30 and TPM 44 may then use a 3PK to create a session key (SK) to be used for protecting communications between processing unit 30 and TPM 44. Processing unit 30 and TPM 44 may then use the SK to create a protected channel. That protected channel may traverse multiple system buses 24 and zero or more components of chipset 34. TPM 44 and processing unit 30 may then use the SK to encrypt communications. In alternative embodiments, multiple session keys may be used for protecting communications between processing unit 30 and TPM 44.

The protected channel may be used, for instance, to load keys or other protected information from TPM 44 into processing unit 30. Likewise, the protected channel may be used to send keys or other sensitive information from processing unit 30 to TPM 44. The protected channel thus ensures that any viewer of the channel cannot determine the contents of the communications, and protects against modification of the data in transit. Furthermore, the process for initializing the channel may authenticate the end-points to protect against unauthorized access and against replay and TPM swap attacks.

Processing system 20 may then determine whether other components are to be authenticated in the preliminary phase of the boot process. If so, further authentication may be performed, such as BBA, as described below.

Figure 4:
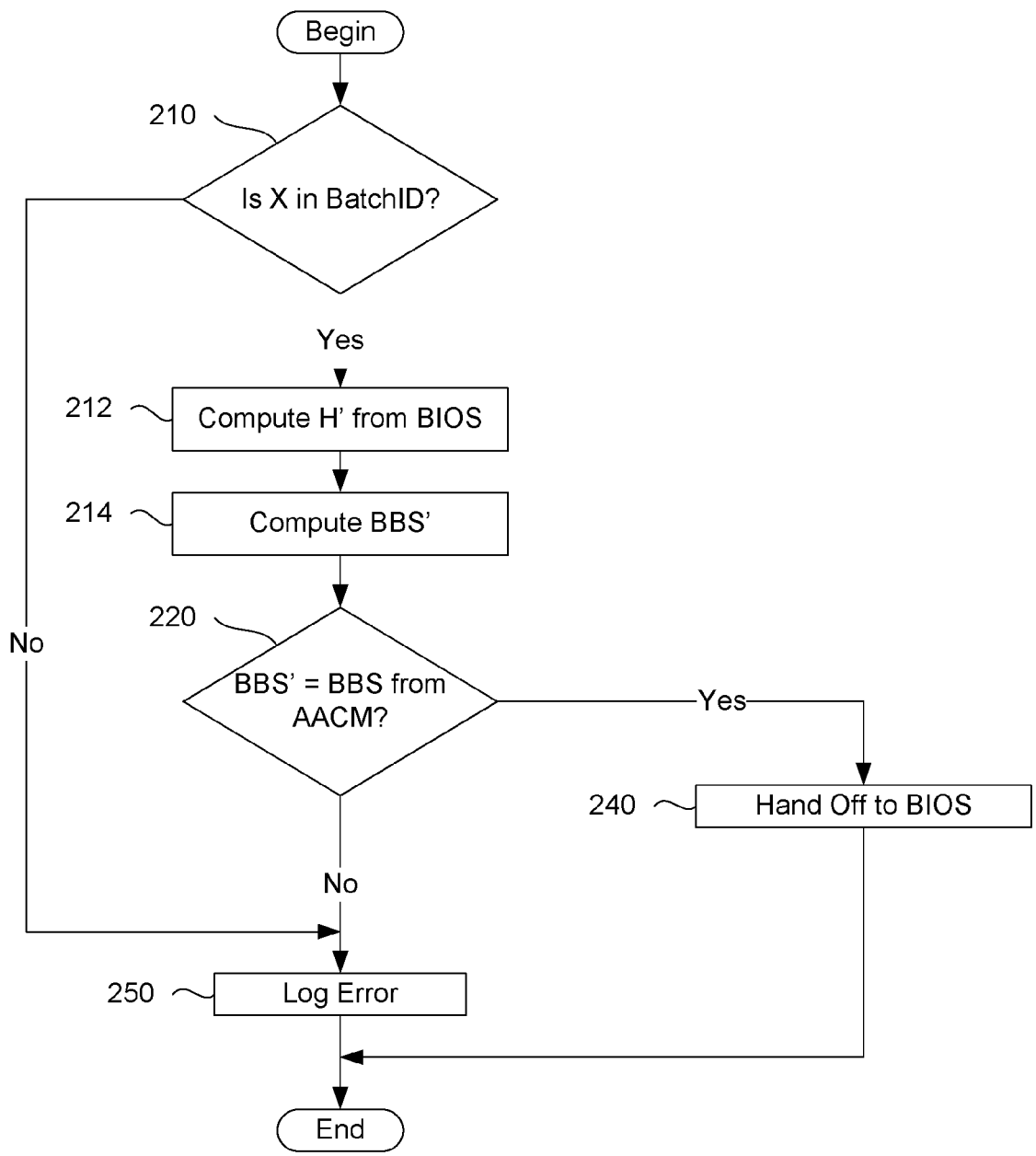
FIG. 4 is a flowchart of an example embodiment of a process for authenticating components of the data processing system of FIG. 1.

FIG. 4 is a flowchart of an example embodiment of a process for authenticating components of processing system 20. The process of FIG. 4 may start after processing system 20 has authentication AACM 60, as indicated above. As shown at block 210, pre-boot authentication manager 71 may then determine whether X (i.e., the processor identifier or the processing system identifier) is in BatchID. If the processor identifier does not belong to the set of approved processors, pre-boot authentication manager 71 may log an error, as shown at block 250, and the process may end without processing system executing the BIOS.

If X is in BatchID, pre-boot authentication manager 71 may compute H' and BBS', as shown at blocks 212 and 214 and described above. Pre-boot authentication manager 71 may then determine whether BBS' matches BBS 70, as depicted at block 220. If BBS' does not match BBS 70, pre-boot authentication manager 71 may log an error, as shown at block 250, and the process may end without processing system executing the BIOS. If they do match, pre-boot authentication manager 71 may hand off control to BIOS 50, possibly by jumping to the reset vector, as shown at block 240. Processing system 20 may then complete the boot process using more or less conventional techniques.

BatchID Assignment

An example scenario for creating BBSs may illustrate some of the advantages provided by one or more embodiments. Those advantages may include easy processing of order changes and/or product returns. The example scenario may include actions such as the following:

- OEM1 orders a batch of 20000 CPUs and is assigned the device IDs 1-10000 and 20000-30000. Anytime prior to delivery of the BBS to OEM1, OEM1 can cancel all or part of the order. In such case, the CPU manufacturer marks the relevant blocks as free in the database of device IDs used for BBS.
- OEM1 cancels half the order, and in response the CPU manufacturer marks IDs 20000-30000 as free, leaving IDs 1-10000 still assigned to OEM1.
- OEM1 submits a request for a BBS on his order, and in response the CPU manufacturer signs the OEM's public key and binds it to IDs 1-10000 (IDs 20000-30000 are not bound).
- OEM2 orders 20000 CPUs, and in response the CPU manufacturer ships the CPUs with IDs 20000-40000 to OEM2.
- The CPU manufacturer can also provide a BBS to OEM2 on that order.

Thus, batches of processors may easily be associated with different purchasers, and processor returns may be processed with relative ease.

BBSs and BBA may provide a variety of benefits. For instance, techniques like those described herein may be used to protect systems against hardware attacks, such as an attack in which the system processor is replaced, as well as software attacks, such as an attack in which the contents of the system ROM are modified. Further, a BBS allows a batch manager to limit the scope of a given signature to a predefined batch of devices. Consequently, a BBS can be viewed as an inherent revocation mechanism, in that authentication will fail if an unapproved processor or an unapproved BIOS is loaded into the system. Consequently, the techniques described herein may make it possible for a system vendor to prevent unauthorized BIOS and/or OS code from running on the systems sold by that vendor, even if the user were to install a different processor and different BIOS code.

BBSs may also provide isolation between batches, between different batch managers, and between different message managers, thereby increasing the security of the procedure. BBSs may also provide for different tradeoffs between isolation level and amount of efforts in handling the signatures, via the batch granularity. For instance, granularity might be varied from (a) binding to a device generation or stepping to (b) binding to each unique device ID. The batch manager and message manager can agree upon the appropriate BatchID components, definition, and granularity. BBSs may also enable pre-boot authentication without affecting the end user's privacy. For instance, when BBA is performed, the only information extracted from the device may be the identifier to verify whether X is in BatchID. If unique device IDs are not used, privacy is maintained. Also, since BBA may be implemented without irreversibly storing information in a processor, the processor vendor can allow returns from the system vendor.

This disclosure illustrates techniques for binding a signature to a batch of identifiers. The teachings of this disclosure allow flexibility to use various signature schemes and different implementations of BatchIDs. The disclosed binding techniques may provide advantages such as isolation between signers, privacy, and limited signature scope.

In light of the principles and example embodiments described and illustrated herein, it will be recognized that the illustrated embodiments can be modified in arrangement and detail without departing from such principles. For instance, the processing system of FIG. 1 includes a dedicated TPM, but alternative embodiments may operate in systems that do not include TPMs or that include embedded TPMs.

In addition, the system firmware in one or more of the embodiments discussed above included BIOS code. However, in alternative embodiments, the system firmware need not include BIOS code. For instance, an alternatively embodiment may involve an embedded OS that does not require a separate BIOS.

Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Also, although certain operations are described as being performed or controlled by an OEM in an example embodiment, other types of entities may perform or control operations in other embodiments, including without limitation entities that perform system configuration, software installation, information technology (IT) assistance, etc. Also, this disclosure refers to the use of keys for various operations. It should be understood such use includes direct and indirect use. For instance, if a first key is used to generate a second key, and then the second key is used in an operation, both keys should be considered to have been used in the operation. The second key will have been used directly, and the first key will have been used indirectly.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for verifying data and hardware in a processing system, the method comprising:
   in a processing system having a system firmware that includes pre-boot authentication logic, reading a processor identifier from a processor in the processing system;
   determining in a processing unit of the processor according to a function, whether the processor belongs to a batch of processors associated with a specific vendor of processing systems, based at least in part on the processor identifier and a batch identifier having a pair of numbers to uniquely identify the batch of processors;
   automatically determining in the processing unit whether the system firmware is authentic, based at least in part on a digitally signed message, including computing a hash of the system firmware, computing a batch bound signature using the hash, a batch bound key, and the batch identifier, and comparing the computed batch bound signature to a batch bound signature stored in the system firmware;
   determining whether or not to execute the system firmware, based at least in part on the determinations of whether the processor belongs to the batch of processors and whether the system firmware is authentic; and
   automatically allowing the processing system to boot in response to determinations that the processor belongs to the batch of processors and the system firmware is authentic, and automatically terminating a boot process in response to a determination that processor does not belong to the batch of processors or the system firmware is not authentic.

2. A method according to claim 1, wherein the operation of determining whether the processor belongs to the batch of processors associated with the specific vendor comprises:
   determining whether the processor identifier belongs to a set of processor identifiers assigned to the specific vendor by a processor manufacturer.

3. A method according to claim 1, wherein the operation of determining whether the processor belongs to the batch of processors associated with the specific vendor comprises:
   obtaining the batch identifier from non-volatile storage in the processing system, wherein the batch identifier defines the batch of processors assigned to the specific vendor by a processor manufacturer; and
   determining whether the processor has been assigned to the specific vendor by the processor manufacturer, based at least in part on the processor identifier and the batch identifier.

4. A method according to claim 1, further comprising:
   before determining whether the processor belongs to the batch of processors, retrieving the data to identify the batch of processors from an augmented authentication code module (AACM) in the processing system.

5. A method according to claim 1, wherein the system firmware comprises a basic input/output system (BIOS).

6. A method according to claim 1, wherein the batch bound signature is stored in an authentication code module by the specific vendor, the authentication code module generated by a processor manufacturer responsive to receipt of the batch bound key, the batch bound signature and the batch identifier from the specific vendor.

7. A processing system comprising:
   a processor comprising a central processing unit including a plurality of processing units and having a processor identifier;
   a candidate boot code module stored in at least one non-volatile storage component; and
   an authentication code module stored in the at least one nonvolatile storage component;
   the processor configured to execute code from the authentication code module before executing code from the candidate boot code module; and
   wherein the authentication code module comprises instructions which, when executed by the processor, cause the processing system to perform operations comprising:
   reading the processor identifier from the processor;
   determining whether the processor belongs to a batch of processors associated with a specific vendor of processing systems, based at least in part on the processor identifier and a batch identifier having a pair of numbers to uniquely identify the batch of processors, before executing any instructions from the candidate boot code module;
   testing authenticity of the candidate boot code module before executing any instructions from the candidate boot code module, including computing a hash of the candidate boot code module, computing a batch bound signature using the hash, a batch bound key, and the batch identifier, and comparing the computed batch bound signature to a batch bound signature stored in the at least one nonvolatile storage component; and
   automatically allowing the processing system to boot in response to determinations that the processor belongs to the batch of processors and the candidate boot code module is authentic, and automatically terminating a boot process in response to a determination that processor does not belong to the batch of processors or the candidate boot code module is not authentic.

8. A processing system according to claim 7, wherein:
   the authentication code module further comprises a secret key of the specific vendor; and
   the candidate boot code module comprises a firmware image, signed using the secret key.

9. A processing system according to claim 7, wherein the operation of determining whether the processor belongs to the batch of processors associated with the specific vendor comprises:
  determining whether the processor identifier belongs to a set of processor identifiers assigned to the specific vendor by a processor vendor.

10. A processing system according to claim 7, wherein the operation of determining whether the processor belongs to the batch of processors associated with the specific vendor comprises:
  obtaining the batch identifier from the at least one nonvolatile storage component, wherein the batch identifier defines the batch of processors assigned to the specific vendor by a processor vendor; and
  determining whether the processor has been assigned to the specific vendor by the processor vendor, based at least in part on the processor identifier and the batch identifier.

11. An apparatus comprising:
  a non-transitory machine-accessible storage medium; and
  an authentication code module in the machine-accessible storage medium, wherein the authentication code module comprises instructions which, when executed by a processor of a processing system, cause the processing system to perform operations comprising:
  reading a processor identifier from the processor;
  determining in a processing unit of the processor according to a function, whether the processor belongs to a batch of processors associated with a particular vendor of processing systems, based at least in part on the processor identifier and a batch identifier having a pair of numbers to uniquely identify the batch of processors; and
  testing authenticity of a candidate boot code module before executing any instructions from the candidate boot code module, including computing a hash of the candidate boot code module, computing a batch bound signature using the hash, a batch bound key, and the batch identifier, and comparing the computed batch bound signature to a batch bound signature stored in the authentication code module; and
  automatically allowing the apparatus to boot in response to the processor belonging to the batch of processors and the candidate boot code module being authentic, and automatically terminating a boot process in response to the processor not belonging to the batch of processors or the candidate boot code module not being authentic.

12. An apparatus according to claim 11, wherein the authentication code module further comprises:
  the batch identifier to define the batch of processors assigned to the particular vendor by a processor vendor.

13. An apparatus according to claim 11, wherein the authentication code module further comprises:
  a digitally signed message involving a digital signature applied to a message comprising data to identify approved system firmware.

14. An apparatus according to claim 11, wherein the authentication code module further comprises:
  a digitally signed message involving a digital signature applied to a message comprising:
  data to identify approved system firmware; and
  the batch identifier to define the batch of processors assigned to the particular vendor by a processor vendor.

* * * * *